(12) United States Patent
Chen et al.

(10) Patent No.: US 8,218,240 B2
(45) Date of Patent: Jul. 10, 2012

(54) IMAGE PRESENTING METHOD, IMAGE PRESENTING SYSTEM AND APPARATUS AND COMPUTER PROGRAM PRODUCT

(75) Inventors: Shih-Han Chen, Taipei (TW); Wen-Kuo Lin, Taipei (TW)

(73) Assignee: Teco Electric & Machinery Co. Ltd., Taipei (TW)

( * ) Notice: Subject to any disclaimer, the term of this patent is extended or adjusted under 35 U.S.C. 154(b) by 397 days.

(21) Appl. No.: 12/698,708

(22) Filed: Feb. 2, 2010

(65) Prior Publication Data

US 2011/0013286 A1 Jan. 20, 2011

(30) Foreign Application Priority Data

Jul. 14, 2009 (TW) .............................. 98123786 A (51) Int. Cl.
*G02B 27/10* (2006.01)
(52) U.S. Cl. ......... 359/619; 359/455; 359/463; 345/629
(58) Field of Classification Search .......... 359/619–622, 359/628, 668, 454, 458, 466, 463; 353/7, 353/10, 94, 121; 40/453; 400/62; 345/629; 156/104

See application file for complete search history.

(56) References Cited

U.S. PATENT DOCUMENTS

| 3,683,525 | A | * | 8/1972 | Fukui ............................... 40/437 |
| 3,829,832 | A | * | 8/1974 | Kawasaki ..................... 382/210 |
| 3,937,565 | A | * | 2/1976 | Alasia ............................. 380/54 |
| 6,366,281 | B1 | * | 4/2002 | Lipton et al. .................. 345/419 |
| 7,400,451 | B2 | * | 7/2008 | Robb et al. .................... 359/619 |
| 7,971,377 | B2 | * | 7/2011 | Zheng ............................ 40/454 |
| 2007/0196153 | A1 | * | 8/2007 | Bar Yona ....................... 400/62 |

FOREIGN PATENT DOCUMENTS

TW 286113 Y 1/2006

* cited by examiner

*Primary Examiner* — Loha Ben
(74) *Attorney, Agent, or Firm* — Morris Manning & Martin LLP; Tim Tingkang Xia, Esq.

(57) ABSTRACT

The invention discloses an image presenting method for generating an image to meet a lenticular sheet of a particular specification. The method includes the following steps: providing a database where at least one lenticular sheet data and at least one alignment pattern data are stored; reading out a lenticular sheet data and an alignment pattern data from the database; processing an image data and the alignment pattern data according to the lenticular sheet data; combining the image data and the alignment pattern data to generate a mixed image which meets the lenticular sheet of the particular specification; and outputting the mixed image.

12 Claims, 6 Drawing Sheets

IMAGE PRESENTING METHOD, IMAGE PRESENTING SYSTEM AND APPARATUS AND COMPUTER PROGRAM PRODUCT

BACKGROUND OF THE INVENTION

1. Field of the Invention

The present invention relates to an image presenting method, an image presenting system, an image presenting apparatus, and a computer program product for generating an image to meet a lenticular sheet of a particular specification.

2. Description of the Prior Art

In the era which the science and technology innovates constantly, the traditional planar image could not met people's demands, so the method and technology for presenting special image has progressed and developed gradually, and what is employed most is the lenticular sheet applied to the image-varying effect, the three-dimensional effect or the animation effect.

In regards to the stereogram viewer in the prior art as disclosed in Taiwan patent No. M286113, the display figure is coated directly on the lenticular sheet, and by use of light refracted by the lenticular sheet, the display figure can be viewed as a stereogram when being presented in front of the human eye. However, according to the Taiwan patent No. M286113, since the lenticular sheet is not able to separate from the display figure, it limits the user to change the display figure at his own choice actually.

Besides, although other prior arts may disclose the separation possibility of the lenticular sheet and the display figure, the problem of the best alignment of the lenticular sheet to the display figure will occur when the user is capable of changing the display figure at his own choice. In fact, if the lenticular sheet is not aligned to the display figure accurately, the display figure will never have the best visual effect.

SUMMARY OF THE INVENTION

An aspect of the invention is to provide an image presenting method for generating an image to meet a lenticular sheet of a particular specification. According to an embodiment of the invention, the method includes the following steps:

providing a database where at least one lenticular sheet data and at least one alignment pattern data are stored; reading out a lenticular sheet data and an alignment pattern data from the database; processing an image data and the alignment pattern data according to the lenticular sheet data; combining the image data and the alignment pattern data to generate a mixed image which meets the lenticular sheet of the particular specification; and outputting the mixed image.

In an embodiment, the alignment pattern data includes a rim pattern located at the circumference of the mixed image. The rim pattern assists in the alignment of the mixed image to the lenticular sheet of the particular specification, and the rim pattern is visible when the mixed image is aligned to the lenticular sheet of the particular specification.

In another embodiment, the alignment pattern data includes plural first color elements and plural second color elements arranged alternately. The plural first color elements and the plural second color elements assist in the alignment of the mixed image to the lenticular sheet of the particular specification. When the mixed image is aligned to the lenticular sheet of the particular specification, the plural first color elements are visible at a first predetermined view angle, and the plural second color elements are visible at a second predetermined view angle.

In another embodiment, the alignment pattern data includes a first alignment point, and the lenticular sheet of the particular specification further has a second alignment point therein. The first alignment point and the second alignment point assist in the alignment of the mixed image to the lenticular sheet of the particular specification. When the mixed image is aligned to the lenticular sheet of the particular specification, the first alignment point superimposes the second alignment point at a straight view angle to form a single alignment point.

Another aspect of the invention is to provide an image presenting system for generating an image to meet a lenticular sheet of a particular specification. According to an embodiment of the invention, the image presenting system includes a storage unit, a processing unit and an output unit. The storage unit is for storing at least one lenticular sheet data and at least one alignment pattern data. The processing unit is for reading out a lenticular sheet data and an alignment pattern data from the storage unit, and then the processing unit processes an image data and the alignment pattern data according to the lenticular sheet data. The processing unit further combines the image data and the alignment pattern data to generate a mixed image which meets the lenticular sheet of the particular specification. Afterwards, the output unit is for outputting the mixed image.

Another aspect of the invention is to provide an image presenting apparatus. According to an embodiment of the invention, the image presenting apparatus includes a lenticular sheet of a particular specification, a figure, and a frame.

The figure has an alignment pattern therein which assists in the alignment of the figure to the lenticular sheet. It should be noted that the figure can be generated and outputted by either the above-mentioned image presenting method or the image presenting system. The frame has an interior space and an observation window. The figure and the lenticular sheet are disposed in the interior space and observable from the observation window.

Another aspect of the invention is to provide a computer program product for generating an image to meet a lenticular sheet of a particular specification. According to an embodiment of the invention, the computer program product executes the following steps when being implemented:

providing a database where at least one lenticular sheet data and at least one alignment pattern data are stored; reading out a lenticular sheet data and an alignment pattern data from the database; processing an image data and the alignment pattern data according to the lenticular sheet data; combining the image data and the alignment pattern data to generate a mixed image which meets the lenticular sheet of the particular specification; and outputting the mixed image.

The advantage and spirit of the invention may be understood by the following recitations together with the appended drawings.

DETAILED DESCRIPTION OF THE INVENTION

Figure 1:
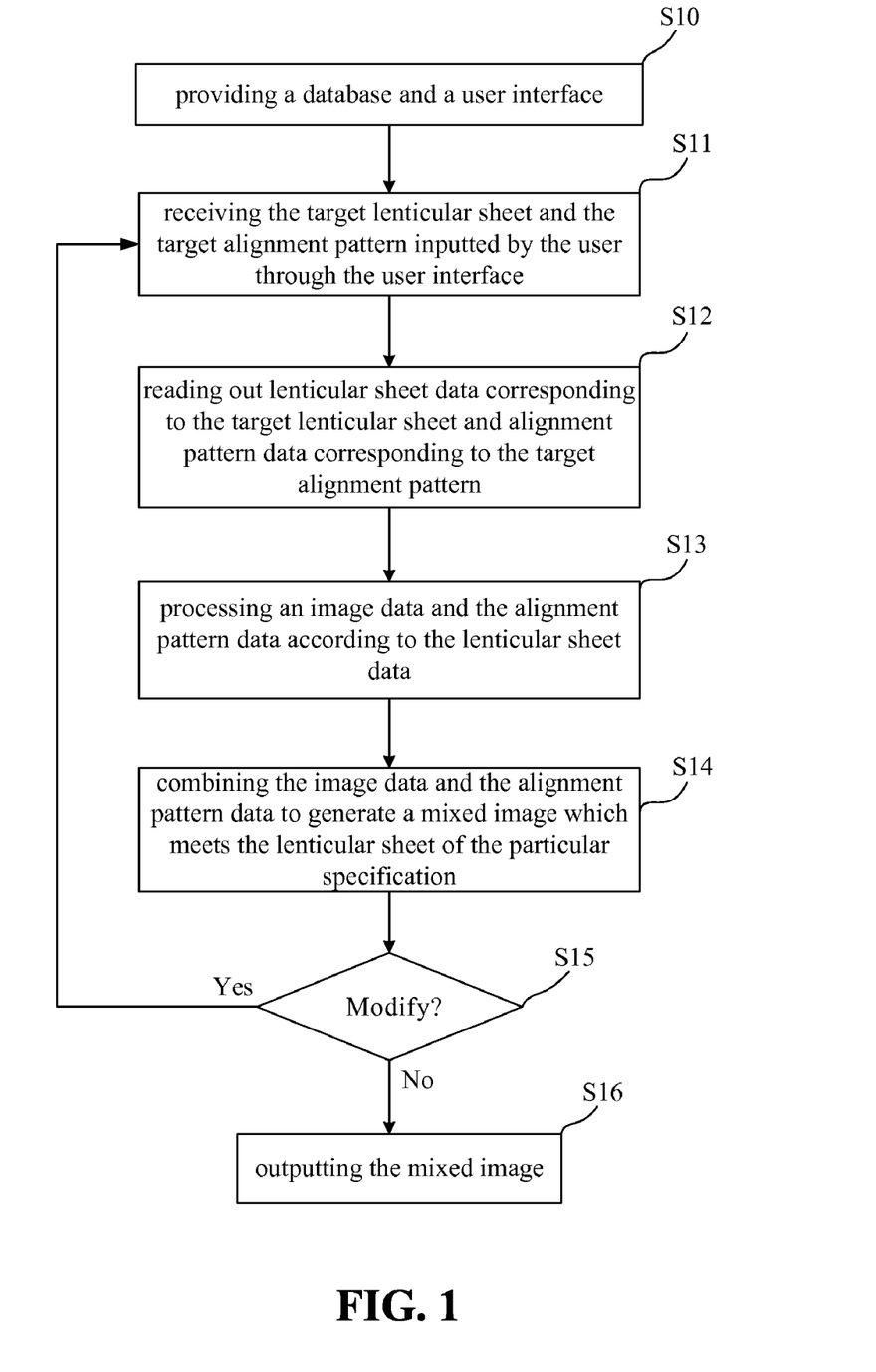
FIG. 1 illustrates the flow chart of the image presenting method according to an embodiment of the invention.

Please refer to FIG. 1. FIG. 1 illustrates the flow chart of the image presenting method according to an embodiment of the invention. The image presenting method of the invention is for generating an image to meet a lenticular sheet of a particular specification. According to an embodiment of the invention, the method includes the steps as shown in FIG. 1.

In step S10, a database and a user interface are provided. In practical applications, the database can store at least one lenticular sheet data and at least one alignment pattern data. The lenticular sheet data can include lenticular sheets of various kinds of specifications, e.g., a locally distributed column-like lens array or a universally distributed column-like lens array. The alignment pattern data can be added in an image to assist in the alignment of the image to the lenticular sheet of the particular specification. In practical applications, a user can further set the style, the color, etc., of the alignment pattern through the user interface.

The user can input or select a target lenticular sheet and a target alignment pattern through the user interface according to the demand of the user. It should be noted that as soon as the user interface is launched in practice, an updating procedure can be implemented by the method of the invention to update the user interface, such as adding items of new target lenticular sheet and new target alignment pattern for the user. Afterwards, in step S11, the target lenticular sheet and the target alignment pattern inputted by the user can be received through the user interface.

In step S12, in response to the target lenticular sheet and the target alignment pattern inputted through the user interface, the database is read for lenticular sheet data corresponding to the target lenticular sheet and alignment pattern data corresponding to the target alignment pattern.

If there are the lenticular sheet data corresponding to the target lenticular sheet and the alignment pattern data corresponding to the target alignment pattern in the database, the lenticular sheet data and the alignment pattern data will be read out from the database; if there are no required data, e.g. the lenticular sheet data corresponding to the target lenticular sheet in the database, an updating procedure can be implemented by the method of the invention to update the content of the database to meet lenticular sheets of various kinds of specifications. In practical applications, it should be noted that as soon as the database is launched, the updating procedure can be implemented by the method of the invention automatically to update the content of the lenticular sheet data and the alignment pattern data in the database, such as adding new data to correspond to the items of the user interface.

Subsequently, step S13 is implemented to process an image data and the alignment pattern data according to the lenticular sheet data, wherein the image data can have types of animals, plants, scenery, animation characters, etc. In detail, the method can adjust the image data and the alignment pattern data to match a column-like lens array of a certain specification and a distributed location to compose an image having a particular visual effect.

It should be noted that the image data can be stored in the database additionally before it is processed. In practical applications, the image data, the lenticular sheet data and the alignment pattern data can be stored in respective databases. Alternately, the image data, the lenticular sheet data and the alignment pattern data can be stored in three folders respectively in the same database.

Subsequently, step S14 is implemented to combine the image data and the alignment pattern data to generate a mixed image which meets the lenticular sheet of the particular specification.

It is particularly explained that in an embodiment, the alignment pattern data is added into the image data in advance and then processed according to the lenticular sheet data to generate the mixed image which meets the lenticular sheet of the particular specification. In another embodiment, the image data and the alignment pattern data are processed according to the lenticular sheet data respectively in advance, and then the processed image data and the processed alignment pattern data are combined to generate the mixed image which meets the lenticular sheet of the particular specification.

Afterwards, step S15 is implemented to inquiry the user whether to modify the generated mixed image. If the user does, the method returns to step S11 for the user to input a new target lenticular sheet and a new target alignment pattern, and then the method executes the follow-up steps; if the user does not, step S16 is implemented to output the mixed image. In practical applications, the generated mixed image can be outputted as an electronic file or can be outputted as a figure by a printer.

It should be particularly noted that the invention discloses a computer program product in an embodiment which executes the steps in FIG. 1 when being implemented. In practical applications, the computer program product can refer to program files accessible through the internet or refer to various computer-readable mediums such as optical discs, hardware, and thumb drives.

Figure 2:
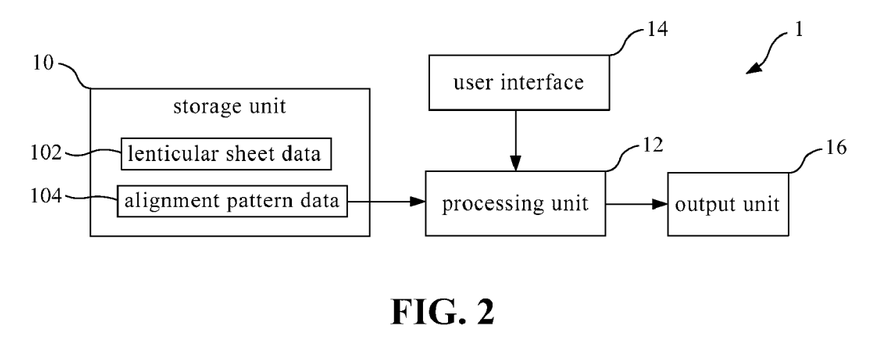
FIG. 2 illustrates the function block diagram of the image presenting system according to an embodiment of the invention.

Please refer to FIG. 2. FIG. 2 illustrates the function block diagram of the image presenting system 1 according to an embodiment of the invention. The image presenting system is for generating an image to meet a lenticular sheet of a particular specification. As shown in FIG. 2, the image presenting system includes a user interface 14, a storage unit 10, a processing unit 12 and an output unit 16.

The storage unit 10 is for storing at least one lenticular sheet data 102 and at least one alignment pattern data 104. The user interface 14 is for a user to input a target lenticular sheet and a target alignment pattern. In response to the target lenticular sheet and the target alignment pattern inputted through the user interface 14, the processing unit 12 reads out lenticular sheet data corresponding to the target lenticular sheet and alignment pattern data corresponding to the target alignment pattern from the storage unit 10. Then, the processing unit 12 processes an image data and the alignment pattern data according to the lenticular sheet data. Subsequently, the processing unit 12 further combines the image data and the alignment pattern data to generate a mixed image which meets the lenticular sheet of the particular specification. Afterwards, the output unit 16 is for outputting the mixed image.

Figure 3:
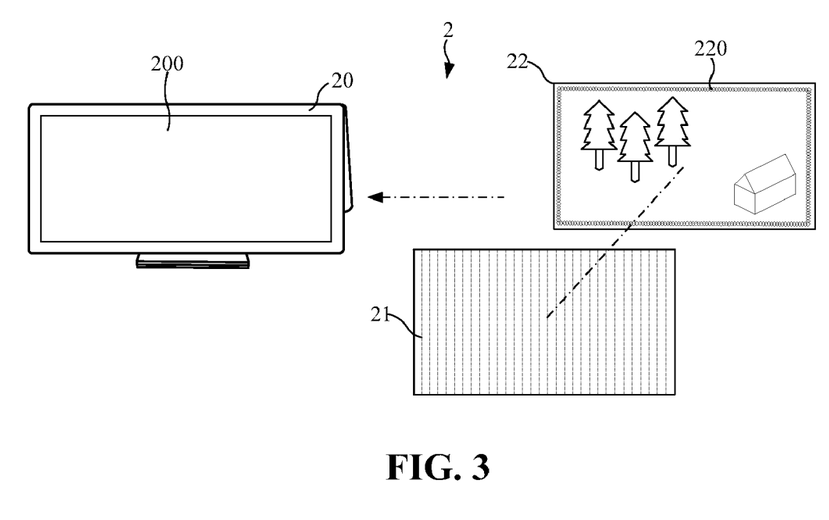
FIG. 3 illustrates the structural schematic diagram of the image presenting apparatus according to an embodiment of the invention.

Please refer to FIG. 3. FIG. 3 illustrates the structural schematic diagram of the image presenting apparatus 2 according to an embodiment of the invention. As shown in FIG. 3, the image presenting apparatus 2 includes a lenticular sheet 21 of a particular specification, a FIG. 22, and a frame 20. It should be noted that the FIG. 22 can be generated and outputted by either the above-mentioned image presenting method or the image presenting system.

In addition, the image presenting apparatus includes plural user-selectable lenticular sheets, wherein the lenticular sheet 21 of the particular specification is selected from one of the plural lenticular sheets. Besides, the lenticular sheet 21 of the particular specification is separable from the FIG. 22 so that the user can choose a suitable lenticular sheet which meets the type of the FIG. 22.

Figure 7:
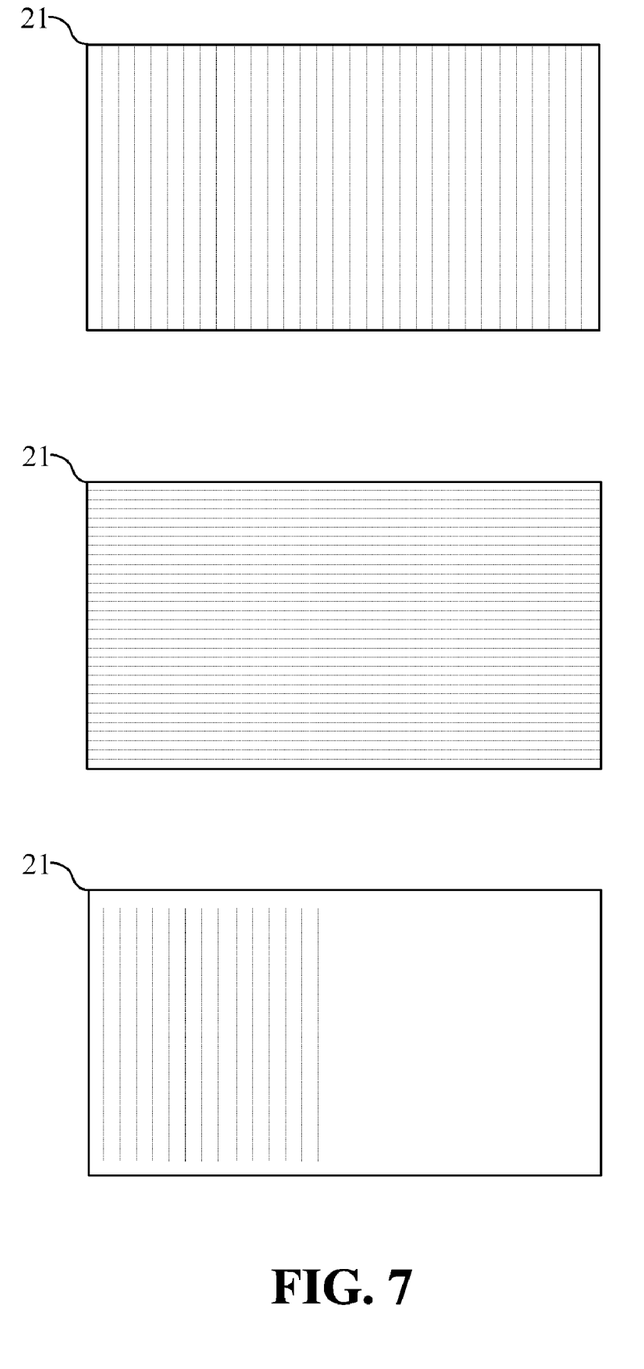
FIG. 7 illustrates the schematic diagrams of the lenticular sheets having a locally distributed column-like lens array and a universally distributed column-like lens array, respectively.

Furthermore, the lenticular sheet 21 of the particular specification has a locally distributed column-like lens array or a universally distributed column-like lens array. As shown in FIG. 7, the column-like lens array can be distributed horizontally or vertically.

It is particular that the FIG. 22 has an alignment pattern 220 therein which assists in the alignment of the FIG. 22 to the lenticular sheet 21. The frame 20 has an interior space and an observation window 200. The FIG. 22 and the lenticular sheet 21 are disposed in the interior space and observable in front of the observation window 200.

Figure 4A:
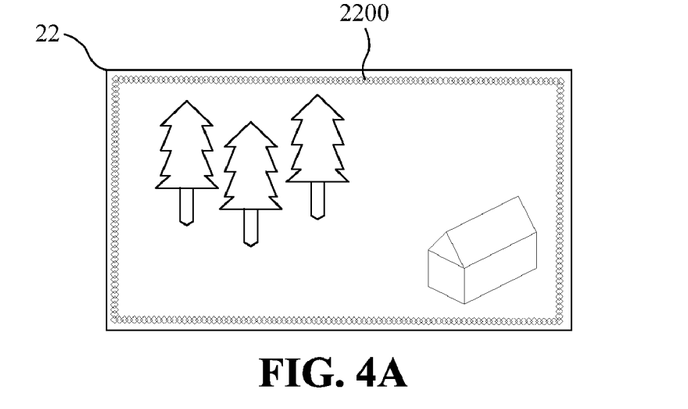
FIGS. 4A to 4C illustrate the schematic diagrams of the lenticular sheet aligned to and not aligned to the figure having the alignment pattern in a first embodiment.
Figure 4B:
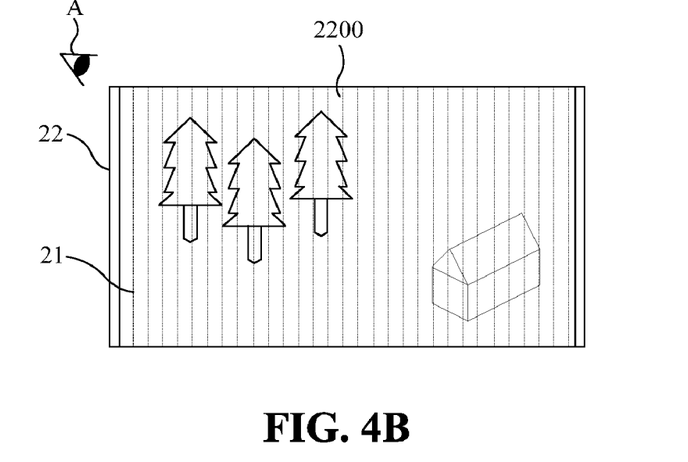
Figure 4C:
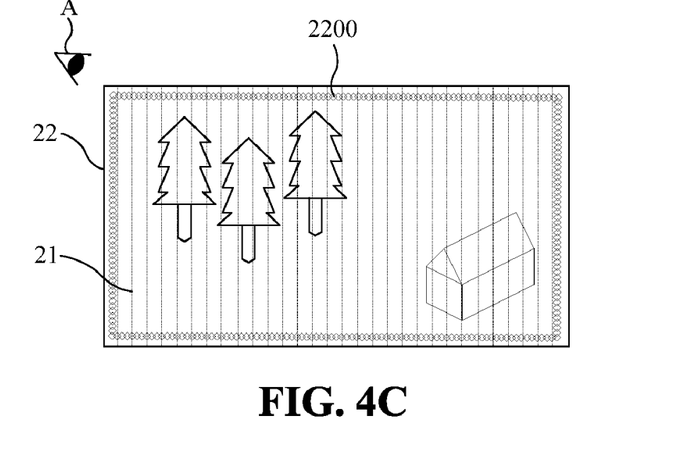

Please refer to FIGS. 4A to 4C. FIGS. 4A to 4C illustrate the schematic diagrams of the lenticular sheet 21 aligned to and not aligned to the FIG. 22 having the alignment pattern in a first embodiment.

In this embodiment, the alignment pattern includes a rim pattern 2200 located at the circumference of the FIG. 22. It should be explained that the location of the rim pattern 2200 can be determined according to the optical quality of the lenticular sheet 21, e.g. the refraction behavior of light refracted by the column-like lens, which assists in the alignment of the FIG. 22 to the lenticular sheet 21. As shown in FIG. 4B, if the FIG. 22 is not aligned to the lenticular sheet 21, the rim pattern 2200 will not be visible at a predetermined view angle A; but as shown in FIG. 4C, if the rim pattern 2200 is visible at the predetermined view angle A, it means that the FIG. 22 is aligned to the lenticular sheet 21 and the FIG. 22 will have the best visual effect under this condition. It is further emphasized that the alignment pattern data can further include plural different types of rim patterns. When the FIG. 22 is aligned to the lenticular sheet 21, a type of rim pattern is visible at a first predetermined view angle, and another type of rim pattern is visible at a second predetermined view angle.

Figure 5A:
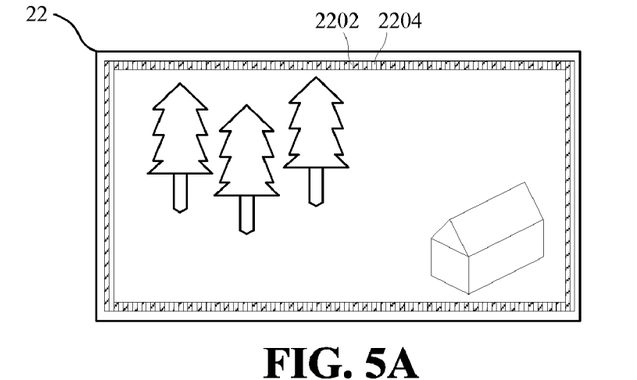
FIGS. 5A to 5C illustrate the schematic diagrams of the lenticular sheet aligned to and not aligned to the figure having the alignment pattern in a second embodiment.
Figure 5B:
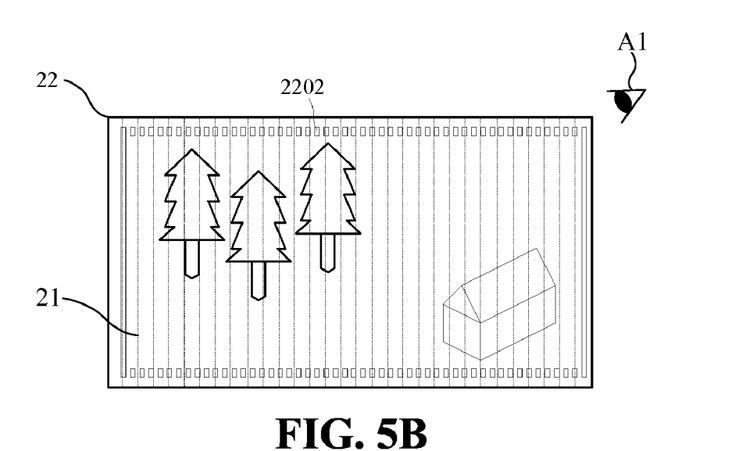
Figure 5C:
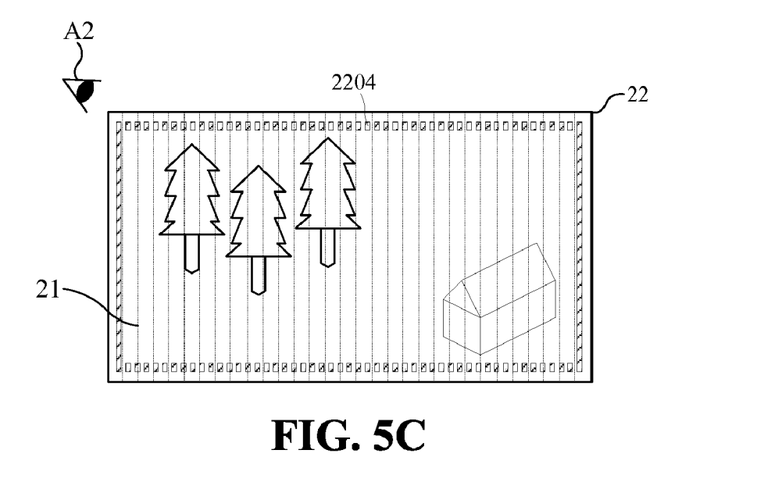

Please refer to FIGS. 5A to 5C. FIGS. 5A to 5C illustrate the schematic diagrams of the lenticular sheet 21 aligned to and not aligned to the FIG. 22 having the alignment pattern in a second embodiment.

In this embodiment, the alignment pattern includes plural first color elements 2202 and plural second color elements 2204 arranged alternately. Similarly, the locations of the plural first color elements 2202 and plural second color elements 2204 can be determined according to the optical quality of the lenticular sheet 21, which assists in the alignment of the FIG. 22 to the lenticular sheet 21. As shown in FIGS. 5A to 5C, when the FIG. 22 superimposes the lenticular sheet 21, if the plural first color elements 2202 are visible at a first predetermined view angle A1 and the plural second color elements 2204 are also visible at a second predetermined view angle A2, it means that the FIG. 22 is aligned to the lenticular sheet 21 and the FIG. 22 will have the best visual effect under this condition. But it should be noted that if the plural first color elements 2202 are not visible at the first predetermined view angle A1 or the plural second color elements 2204 are not visible at the second predetermined view angle A2, it means that the FIG. 22 is not aligned to the lenticular sheet 21.

Figure 6A:
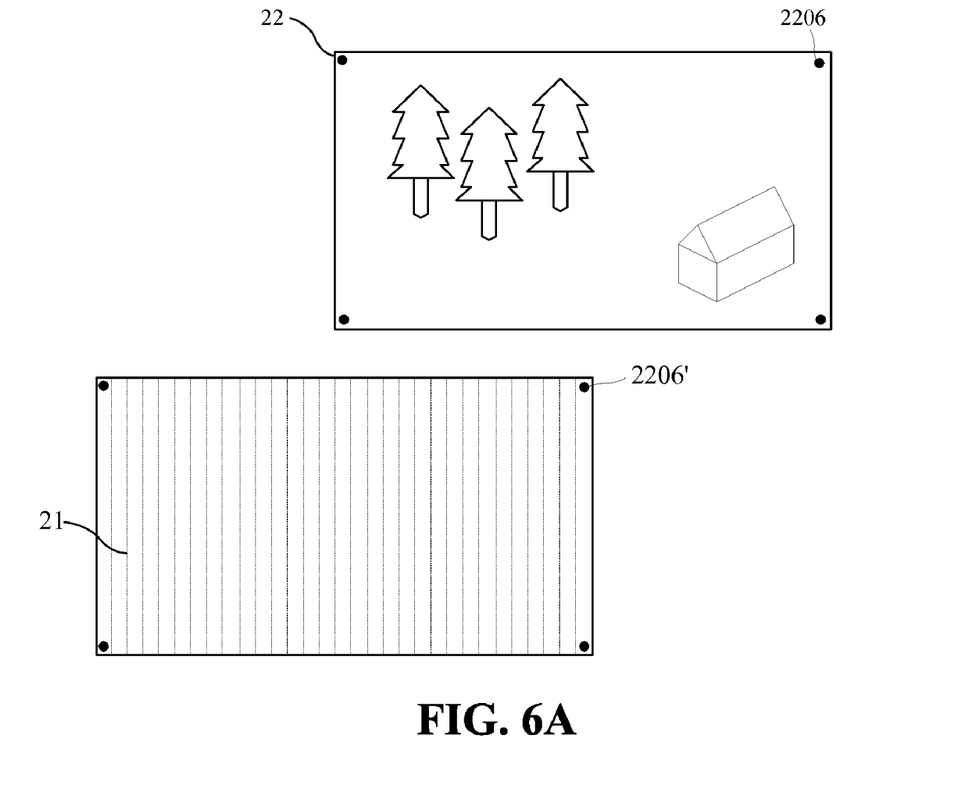
FIGS. 6A and 6B illustrate the schematic diagrams of the lenticular sheet aligned to and not aligned to the figure having the alignment pattern in a third embodiment.
Figure 6B:
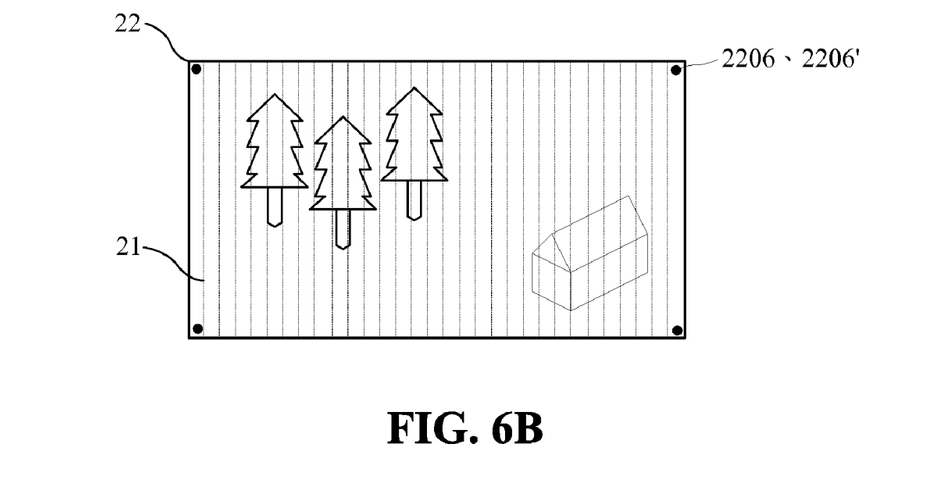

Please refer to FIGS. 6A and 6B. FIGS. 6A and 6B illustrate the schematic diagrams of the lenticular sheet 21 aligned to and not aligned to the FIG. 22 having the alignment pattern in a third embodiment.

In this embodiment, the alignment pattern can include a set of first alignment points 2206, e.g. the four points at the corners of the FIG. 22, while the lenticular sheet 21 further has a set of second alignment points 2206' therein, e.g. the four points at the corners of the lenticular sheet 21. As shown in FIG. 6B, under the condition which the FIG. 22 superimposes the lenticular sheet 21, if the first alignment points 2206 superimpose the second alignment points 2206' at a straight view angle to form only four visible points, it means that the FIG. 22 is aligned to the lenticular sheet 21.

To sum up the above descriptions, the invention can generate a figure to meet a lenticular sheet of a particular specification according to the demand of the user. Particularly, the figure has an alignment pattern therein according to the invention which assists the user in the alignment of the figure to the lenticular sheet so that the figure has the best visual effect.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image presenting method for generating an image to meet a lenticular sheet of a particular specification, the method comprising the following steps:
   providing a database where at least one lenticular sheet data and at least one alignment pattern data are stored;
   reading out the at least one lenticular sheet data and the at least one alignment pattern data from the database;
   processing an image data and the at least one alignment pattern data according to the at least one lenticular sheet data;
   combining the at least one image data and the at least one alignment pattern data to generate a mixed image which meets the lenticular sheet of the particular specification; and
   outputting the mixed image.

2. The method of claim 1, wherein the at least one alignment pattern data is added into the image data in advance and then processed according to the at least one lenticular sheet data to generate the mixed image which meets the lenticular sheet of the particular specification.

3. The method of claim 1, wherein the image data and the at least one alignment pattern data are processed according to the at least one lenticular sheet data respectively in advance, and then the processed image data and the processed alignment pattern data are combined to generate the mixed image which meets the lenticular sheet of the particular specification.

4. The method of claim 1, further comprising the following steps:
   providing a user interface for a user to input a target lenticular sheet and a target alignment pattern; and
   in response to the target lenticular sheet and the target alignment pattern inputted through the user interface, reading out the at least one lenticular sheet data corresponding to the target lenticular sheet and the at least one alignment pattern data corresponding to the target alignment pattern from the database.

5. The method of claim 1, wherein the at least one alignment pattern data includes a rim pattern located at the circumference of the mixed image, the rim pattern assists in the alignment of the mixed image to the lenticular sheet of the particular specification, and the rim pattern is visible when the mixed image is aligned to the lenticular sheet of the particular specification.

6. The method of claim 1, wherein the at least one alignment pattern data includes plural first color elements and plural second color elements arranged alternately, the plural first color elements and the plural second color elements assist in the alignment of the mixed image to the lenticular sheet of the particular specification, when the mixed image is aligned to the lenticular sheet of the particular specification, the plural first color elements are visible at a first predetermined view angle, and the plural second color elements are visible at a second predetermined view angle.

7. The method of claim 1, wherein the at least one alignment pattern data includes a first alignment point, and the lenticular sheet of the particular specification further has a second alignment point therein, the first alignment point and the second alignment point assist in the alignment of the mixed image to the lenticular sheet of the particular specification, when the mixed image is aligned to the lenticular sheet of the particular specification, the first alignment point superimposes the second alignment point at a straight view angle to form a single alignment point.

8. The method of claim 1, further comprising the step of updating the content of the database.

9. An image presenting system for generating an image to meet a lenticular sheet of a particular specification, the system comprising:
   a storage unit for storing at least one lenticular sheet data and at least one alignment pattern data;
   a processing unit for reading out the at least one lenticular sheet data and the at least one alignment pattern data from the storage unit, the processing unit processing an image data and the at least one alignment pattern data according to the at least one lenticular sheet data, the processing unit further combining the image data and the at least one alignment pattern data to generate a mixed image which meets the lenticular sheet of the particular specification; and
   an output unit for outputting the mixed image.

10. The system of claim 9, further comprising:
   a user interface for a user to input a target lenticular sheet and a target alignment pattern, the processing unit reading out, in response to the target lenticular sheet and the target alignment pattern inputted through the user interface, the at least one lenticular sheet data corresponding to the target lenticular sheet and the at least one alignment pattern data corresponding to the target alignment pattern from the storage unit.

11. A computer program product for generating an image to meet a lenticular sheet of a particular specification, the computer program product executing the following steps when being implemented:
   providing a database where at least one lenticular sheet data and at least one alignment pattern data are stored;
   reading out the at least one lenticular sheet data and the at least one alignment pattern data from the database;
   processing an image data and the at least one alignment pattern data according to the at least one lenticular sheet data;
   combining the image data and the at least one alignment pattern data to generate a mixed image which meets the lenticular sheet of the particular specification; and
   outputting the mixed image.

12. The computer program product of claim 11, further executing the following steps:
   providing a user interface for a user to input a target lenticular sheet and a target alignment pattern; and
   in response to the target lenticular sheet and the target alignment pattern inputted through the user interface, reading out the at least one lenticular sheet data corresponding to the target lenticular sheet and the at least one alignment pattern data corresponding to the target alignment pattern from the database.

* * * * *